United States Patent
Rabenhorst

[15] 3,694,042
[45] Sept. 26, 1972

[54] RADIAL FLUID BEARING

[72] Inventor: David W. Rabenhorst, Silver Spring, Md.

[73] Assignee: The Johns Hopkins University, Baltimore, Md.

[22] Filed: March 1, 1971

[21] Appl. No.: 119,501

[52] U.S. Cl. .............................................. 308/36.3
[51] Int. Cl. ............................................. F16c 33/72
[58] Field of Search .......... 308/36.3, 36.2, 36.4, 160, 308/168

[56] References Cited

UNITED STATES PATENTS

| | | | |
|---|---|---|---|
| 2,133,879 | 10/1938 | Thearle | 277/14 |
| 2,665,929 | 1/1954 | Sawyer | 277/14 |
| 1,014,850 | 1/1912 | Richardson | 308/36.3 |
| 1,879,625 | 9/1932 | Mendenhall et al. | 308/36.3 |

Primary Examiner—Martin P. Schwadron
Assistant Examiner—Frank Susko
Attorney—John S. Lacey

[57] ABSTRACT

The invention comprises related embodiments of a basic rotary bearing having primarily effective sealing and either radial loading or thrust loading. Journaling capability is realized by holding a stationary annular member having a substantially triangularly cross-sectional flange within a high density fluid centrifugally retained within a rotary annular cavity. Imposition of a radial load on the structure biases the stationary annular member into the fluid until the buoyant force exerted on said member by the fluid equals the imposed load. In another embodiment having thrust loading capability, the stationary member comprises a disc-like thrust plate held within a rotating cavity, the outer annular edges of the plate being immersed in a fluid held along the inner periphery of the cavity by the rotary motion thereof.

7 Claims, 9 Drawing Figures

INVENTOR.
DAVID W. RABENHORST

INVENTOR.
DAVID W. RABENHORST

INVENTOR.
DAVID W. RABENHORST

RADIAL FLUID BEARING

The invention herein described was made in the course of or under a contract or subcontract thereunder, with the Department of the Navy.

BACKGROUND AND SUMMARY OF THE INVENTION

The invention is primarily a passive rotary radial, or journal, bearing capable of high speed or extreme temperature operation under a heavy loading condition with minimum friction. The invention may alternately be configured to provide primarily a rotary structure having substantial thrust loading capability or high pressure sealing capability. Essentially, the rotary structures disclosed herein depend upon the creation of a high acceleration field on a fluid by high speed rotation of the fluid.

A first embodiment of the invention substantially comprises a stationary journal plate having an annular flange which "floats" in a fluid-containing reservoir disposed in an oppositely facing rotary housing formed integrally with a rotary shaft. Radial loading imposed on the shaft shifts the aforementioned flange within the fluid contained by the rotary housing until the buoyant force of the fluid balances the imposed load.

A second embodiment of the invention having substantial thrust capability essentially comprises a rotary housing having a cavity containing a high density fluid surrounding a fixed thrust plate, the rotation of the fluid producing a centrifugal acceleration field on the fluid. The high density fluid seals a second, less dense fluid within the structure whereby the second fluid exerts pressure against one side of the fixed thrust plate. Imposition of axial loading on the structure increases the pressure exerted by the second fluid on the thrust plate, the pressure head on the high density fluid simultaneously developed acting to resist and balance (at equilibrium) the pressure exerted by said second fluid. Thus, a portion of the rotary housing acts as a rotary thrust plate.

A third embodiment of the invention provides a rotary sealing structure operable at high pressures with minimum leakage. The sealing structure essentially comprises a rotatable annular housing having a cavity, rotation of the housing by centrifugal force causing a high density fluid in the housing to surround a stationary annular flange, the perimeter of which flange extends into and intimately contacts the rotating fluid. Thus the seal is formed by the high density fluid and maintains a pressure differential between the front and real of the seal.

Pertinent prior rotary structures include the dynamic seal disclosed by McHugh in U.S. Pat. No. 3,097,853. The referenced seal is comprised of a rotary disc held within a fixed cavity containing a magnetizable fluid. Force is imparted to the fluid held in the cavity by means of an elaborate array of electromagnetic apparatus disposed in the cavity and by the rotation of the disc itself. Thus, McHugh utilizes centrifugal force on a contained fluid to provide a sealing function. However, the centrifugal force acting on the fluid is produced in an entirely different fashion in the present invention. As can be easily understood in light of the following disclosure, rotation of a fluid in a cavity produces a centrifugal acceleration filed on the fluid more simply and more efficiently. In particular, fluid cavitation problems are eliminated. Additionally, the present invention provides both journal and thrust bearing capability in the several embodiments thereof.

Accordingly, a primary object of the invention is to provide a rotary structure wherein a high centrifugal acceleration field is produced on a fluid rotating at high speeds in order to react said field with an imposed force acting on the structure.

Another object of the invention is to provide a radial bearing in which a stationary bearing member is acted upon by a fluid in a cavity contained in a rotating race or housing.

A further object of the invention is to provide a thrust bearing in which rotational motion is imparted to a housing having a cavity with a high density fluid held therein, thereby to interact centrifugal forces acting on the fluid with the pressure head produced by the sealing of said fluid within the cavity.

Still another object of the invention is to provide a sealing structure in which rotational motion is efficiently and simply imparted to a high density fluid contacting a stationary sealing flange around the perimeter thereof, thereby to seal said structure.

Further objects and attendant advantages of the invention will become more readily apparent in light of the following detailed description of the several embodiments of the invention.

DESCRIPTION OF THE PREFERRED EMBODIMENTS

Figure 1:
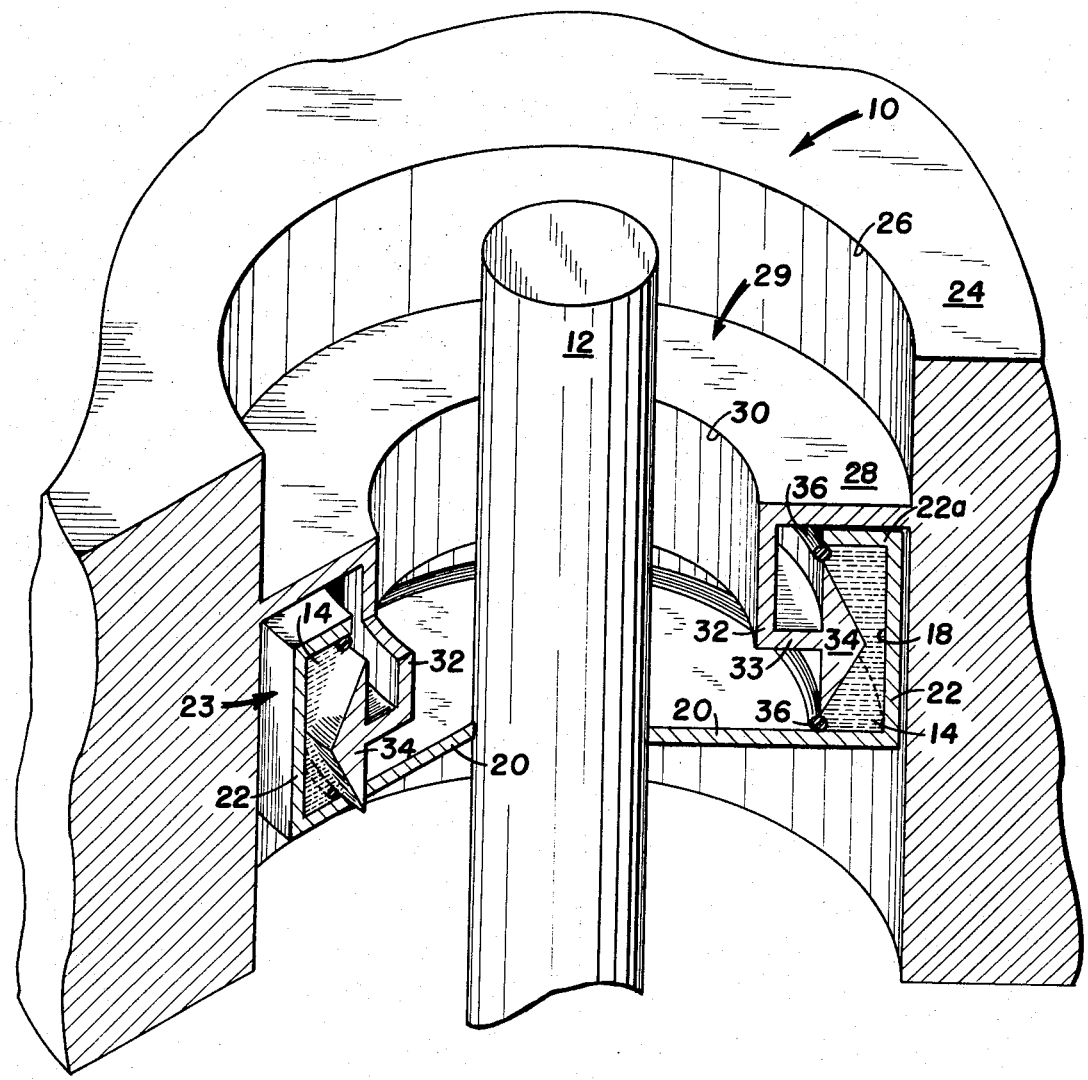
FIG. 1 is a perspective in partial section of an idealized first embodiment of the invention, a radial bearing having portions thereof shown cut-away in stages to conveniently illustrate the structure thereof.

A first embodiment of the invention comprises the radial bearing structure shown at 10 in FIG. 1. Essentially, the bearing 10 opposes an imposed radial load on a rotary shaft 12 by means of buoyant force exerted by a dense fluid 14 on a stationary annular bearing element which "floats" in the fluid. The fluid 14 is centrifugally held within and around the inner periphery of a rotating cavity 18 formed in a rotary bearing plate 20. Since metal contact is eliminated under rated loading, extended bearing life results.

The rotary shaft 12 is seen to be formed integrally with the rotary bearing plate 20, the plate 20 being preferably annular in shape and coaxial with the shaft 12 and perpendicular thereto. Although the shaft 12 and plate 20 may be separate, discrete units, sealing problems must be considered with such a structure. The plate 20 also has an integral annular flange 22 which with said plate and a re-entrant flange 22a form a trough-like rotatable housing 23. The housing 23 forms and defines the annular rotating trough or cavity 18 which contains the dense fluid 14. Rotation of the shaft 12 thus causes the fluid 14 to be held by centrifugal force within and around the inner periphery of the rotating cavity 18.

A stationary body 24 has an annular bore 26 therein which receives the shaft 12 therethrough. The bore 26 has an annular stationary bearing plate 28 therein, which plate extends inwardly from said body. The plate 28 forms a portion of a race 29 which has a circular opening 30 therein for receiving the shaft 12 freely therethrough, the opening being defined by a wall 32 that has a re-entrant flange 33 to the inner periphery of which is attached an annular bearing element 34 that is of triangular cross-section.

As will be seen, the trough-like housing 23 receives the bearing element 34 therein with the upper and lower apices of said element spaced in proximity to the rim of the flange 22a and the plate 20 near the outer rim thereof, respectively. The annular bearing element 34 contacts the fluid 14 in the housing 23 and substantially "floats" in said fluid.

Seals 36, which may conveniently be of the commercially-available ferrofluid type, maintain the fluid 14 within the cavity 18 when the shaft 12 is stationary. In an operative embodiment of the structure, bearings such as conventional ball bearings or loose sleeve bearings, may be disposed around the shaft 12 to accommodate static and starting loads. These bearings would be intentionally arranged to disengage from the outer portion of the wall 32 when the shaft reaches sufficient speed for the bearing 10 to accommodate the loading on the shaft.

Imposition of a radial load on the shaft 12 causes the annular bearing element 34 to be forced into the fluid 14, thereby displacing a finite amount of said fluid. The fluid 14 thus exerts a buoyant force on the element 34 which, within the design range of the bearing, equals the imposed radial load. The load capability of the bearing 10 may be determined from the relationship expressing the force on a rotating fluid, $F=MR\omega_2$. The radial loading capability of the bearing 10 is doubled by the use of the triangularly cross-sectioned element 34. Effectively, the load-carrying capability of the bearing 10 varies as the square of the bearing radius and as the square of the rotational speed. Obviously, the capability of the bearing 10 also varies directly with the specific gravity of the fluid 14.

Figure 2:
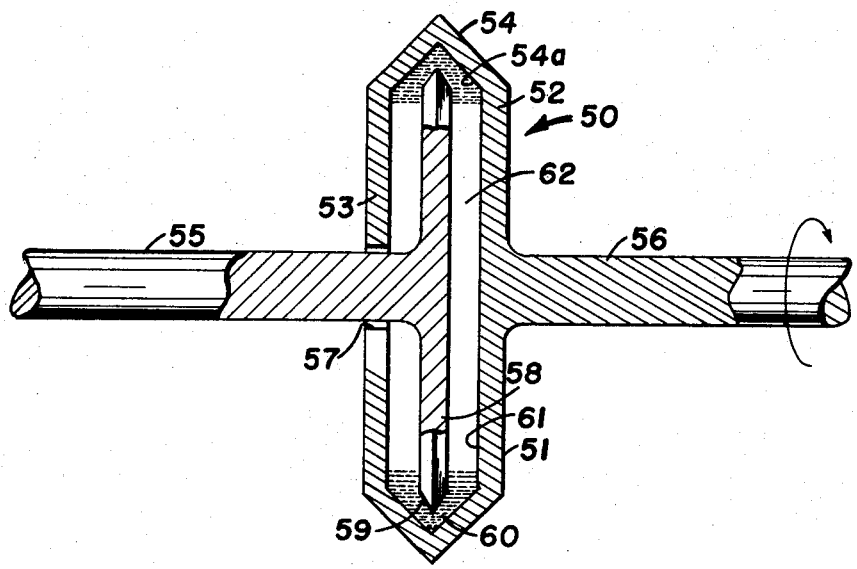
FIG. 2 is a sectional view of an idealized second embodiment of the invention having thrust capability.

An embodiment of the invention having primarily thrust capability is shown in FIG. 2. Essentially, the thrust bearing shown at 50 includes a rotatable housing 51 comprised of spaced parallel annular walls 52 and 53 which are perpendicular to a common axis shared by both a stationary shaft 55 and a rotatable shaft 56. The plates 52 and 53 are connected by an outwardly directed rim 54, having a V-shape wall which defines a trough 54a. The plate 52 is formed coaxially and integrally with the shaft 56, rotation of the shaft 56 causing rotation of the housing 51.

The stationary shaft 55 is disposed along the longitudinal axis of the rotatable shaft 56, the shaft 55 freely extending through an axial port 57 in the plate 53 and terminating within the housing 51. An annular thrust disc 58 is disposed within the housing 51 and coaxially joined to the terminal end of the shaft 55, the disc 58 having a diameter less than the inner diameter of the housing. The thrust disc 58 may be formed as a simple right circular cylinder having a width much less than its diameter. However, the bearing 50 is more efficient if the disc is formed with a tapered distal circumferential edge 59. The V-shape wall of the rim 54 conforms to the surface of the tapered edge 59 of the disc 58.

The housing 51 contains a volume of a dense fluid 60, the fluid 60 being centrifugally maintained in the trough 54 upon rotation of said housing. When the housing 51 is rotating, the perimeter of the thrust disc 58 extends into the fluid 60, thus sealing a portion of the volume within the housing, that sealed volume being designated as cavity 61. The cavity 61 contains a fluid 62 which may conveniently be air.

Figure 3A:
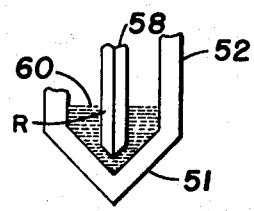
FIGS. 3a and 3b are schematic views of a portion of the thrust bearing structure of FIG. 2, illustrating the operation of the bearing.
Figure 3B:
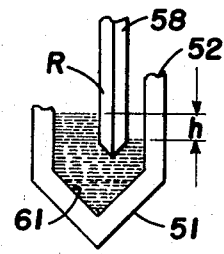

The manner in which the bearing 50 resists an imposed axial load is schematically shown in FIGS. 3a and 3b. Essentially, the fluid 60 can be considered to surround a fixed barrier, i.e., the stationary thrust disc 58. Rotation of the housing 51 sets up a centrifugal acceleration field on the fluid 60. If the bearing 50 is not under an imposed load, the disc 58 occupies the position indicated in FIG. 3a. The dense fluid 60 is seen to maintain an equal level on either side of the disc 58. Imposition of a load on the bearing 50 causes displacement of the disc 58 relative to the housing 51, thus increasing the pressure of the fluid 62 within the cavity 61. The displaced disc 58 is shown in FIG. 3b. The dense fluid 60 is thus caused to develop a pressure head, as seen from the unequal levels of the fluid 60 on the two sides of the disc 58. The bearing 50 resists the imposed load thereon when the pressure head developed by the fluid 60 equals the pressure exhibited by the fluid 62 held within the cavity 61. The thrust capability of the bearing 50 is given by:

$$T = (W/g) R \omega^2 A$$

where:
T = thrust, lb.
W = fluid density, lb./in³
R = nominal fluid radius, ft.
ω rotation speed, radians/sec
h = pressure head, inches
A = pressure area, square inches
g = gravitational acceleration Thus, the thrust capability of a bearing having a 2 inch diameter, rotating at 3,000 radians/sec, and utilizing elemental mercury as the fluid 60, would equal approximately 3,500 pounds.

The thrust capability of the bearing 50 is actually provided by the fluid 62 trapped between the disc 58 and the fluid 60. Thus, the relative axial displacement between the stationary disc 58 and the walls 52 is proportional to the pressure (relative to ambient) within the cavity 61. Provision of an artificial internal pressure would decrease the operating air gap between the disc 58 and the opposing parallel wall of the cavity 61. Relative axial motion between the stationary disc 58 and the wall 52 may be virtually eliminated by utilizing a low density liquid, such as light silicone oil or acetone as the fluid 62, the incompressibility of the substituted fluid thereby limiting axial motion to that resulting from the fluid head.

Figure 4:
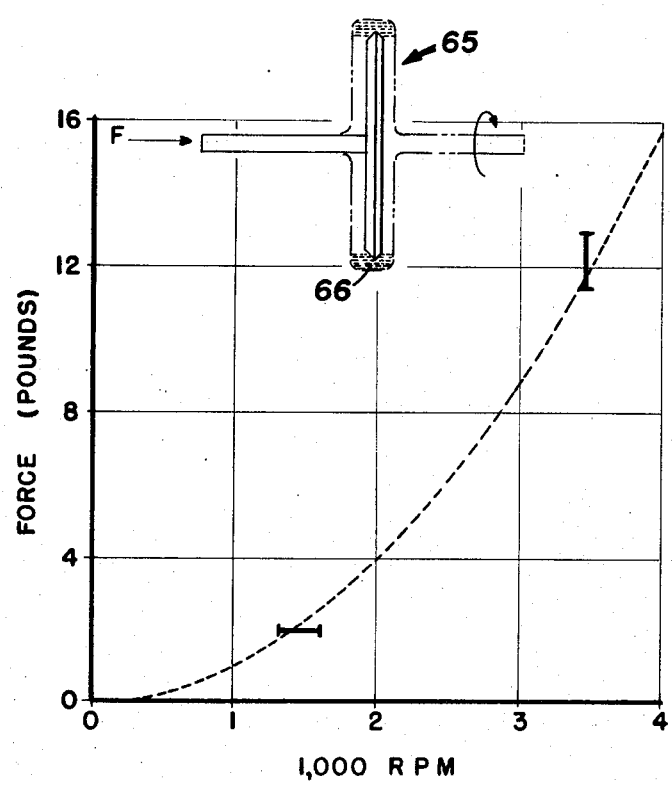
FIG. 4 is a graph illustrating the relationship between an imposed force on a model bearing shown inset on the graph and the angular velocity of the bearing.
Figure 5:
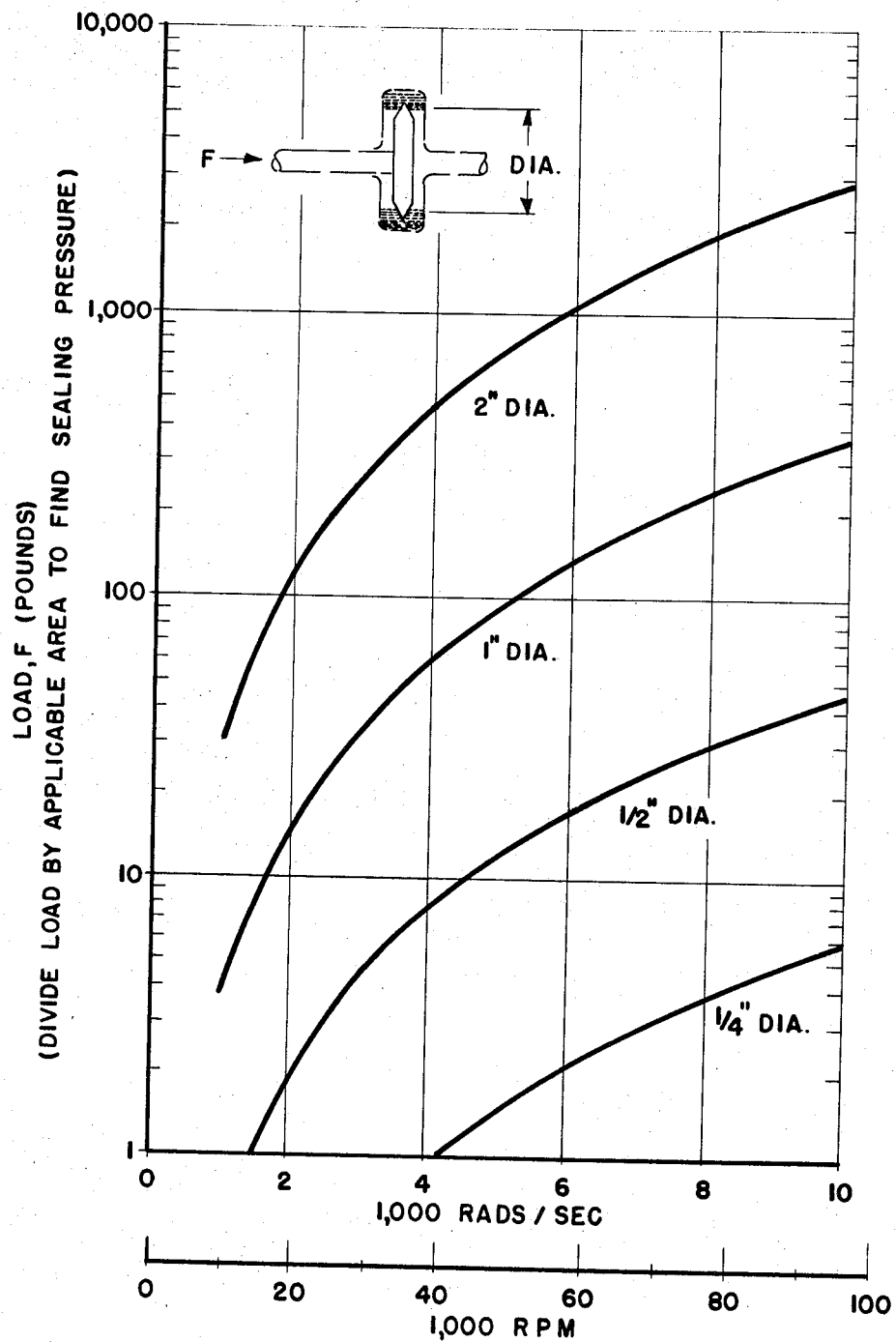
FIG. 5 is a graph illustrating the theoretical relationship between bearing load capability and bearing angular velocity.

The measured operating characteristics of a model of the bearing 50 are shown in FIG. 4. A schematic of the model from which the data on the graph was derived as shown inset on the graph at 65, the imposed load on the bearing model 65 being represented by the vector, F. As seen from the graph, an 11.5 pound load is resisted at 4,000 rpm, the operating fluid 66 used being relatively low-density water. Substitution of elemental mercury into the model 65 produced 155 pound load capability under the same conditions. FIG. 5 is a graph illustrating the theoretical bearing load capability versus bearing angular velocity, based on the data obtained from the model 65 of FIG. 4. These projected values are determined by assuming both drag and thrust to vary with the square of the angular velocity of the bearing, by assuming drag to vary as the cube of the diameter, and by assuming thrust to vary as the square of the diameter. The values represented by FIG. 5 assume the use of water as the operating fluid. Since the fluid used in the present bearing is held under great pressure, the bearing may be operated at a higher temperature for a given fluid than the normal fluid boiling point.

A noteworthy performance characteristic of the bearing 50 is that the drag of the bearing does not increase appreciably with load due to the fact that the contact area between the disc 58 and the fluid 60 does not vary with the imposed load. As the pressure head within the cavity 61 causes the fluid 60 to move outwardly on one side of the disc 58 (as best seen in FIG. 3b), an inward movement of the fluid 60 occurs on the other side of the disc 58, i.e., the levels of the fluid 60 on opposite sides of the disc 58 are unequal. The volume of the amount of fluid 60 moving to one side of the disc 58 is virtually identical to that volume of fluid displaced on the other side of the disc 58. Thus, the area of contact between the disc 58 and fluid 60 remains constant regardless of the pressure head; hence, drag does not vary with load.

Figure 6:
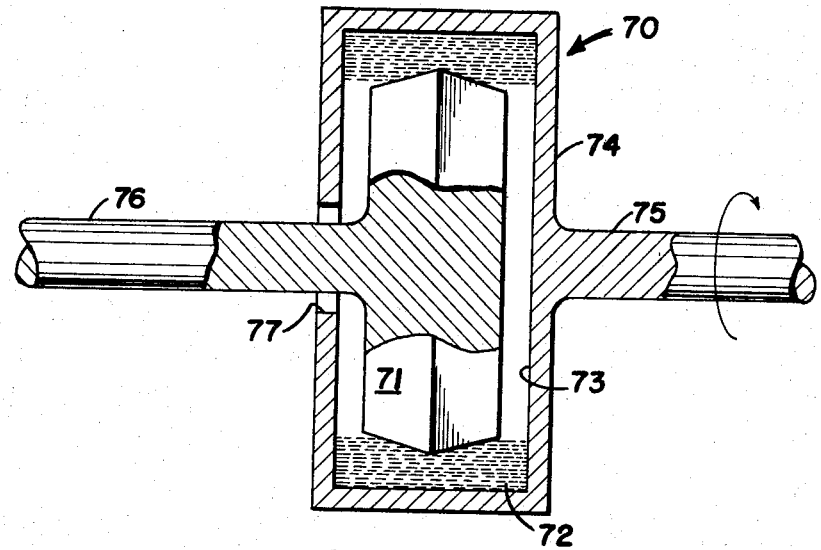
FIG. 6 is an idealized view, in section, of a rotary bearing having thrust and radial capability.

Shaping the thrust disc 58 of FIG. 2 in the manner shown in FIG. 6 results in a bearing 70 having substantial radial loading capability. Stationary member 71 essentially comprises identical frusto-conical sections joined at the base surfaces thereof. The member 71 may be contained, along with a high density fluid 72, within a cylindrical rotary housing 74. The housing 74 has an axial shaft 75 integrally joined thereto. As in the bearing 50 of FIG. 2, the stationary member 71 has an axial shaft 76 attached thereto, which shaft 76 freely extends into the cavity 73 through an axial port 77 in the housing 74.

Rotation of the housing 74 by the shaft 75 accelerates the fluid 72 in the manner described hereinabove for the bearing 50. Imposition of a radial load on the bearing 70 displaces the stationary member 71 relative to the rotary housing 74, thus causing an increasing displacement of the fluid 72 (and an increased pressurization of fluid 74 within the cavity 73). The radial load capability of the bearing 70 is given by:

$$L = D_E W_E$$

where:
$L$ = radial load, in pounds
$D_E$ = effective relative displacement, cubic inches
$W_E$ = effective density of fluid 72, i.e., $g W$.

The dimensions of the bearing 70 may be chosen so that a 0.001 inch relative deflection of the bearing results in a 0.001 cubic inch net displacement of the stationary member (and of the fluid 72, in this case elemental mercury), thus producing a load capability for a two-inch diameter bearing rotating at 3,000 radians per second of 4,500 pounds per 0.001 inch displacement.

The load capability for a given unit displacement may be varied according to the cross-section of the stationary member 71. The bearing 70 will retain axial load capability, the stationary member 71 being advantageously shaped to provide desired combinations of axial and radial capability.

Figure 7:
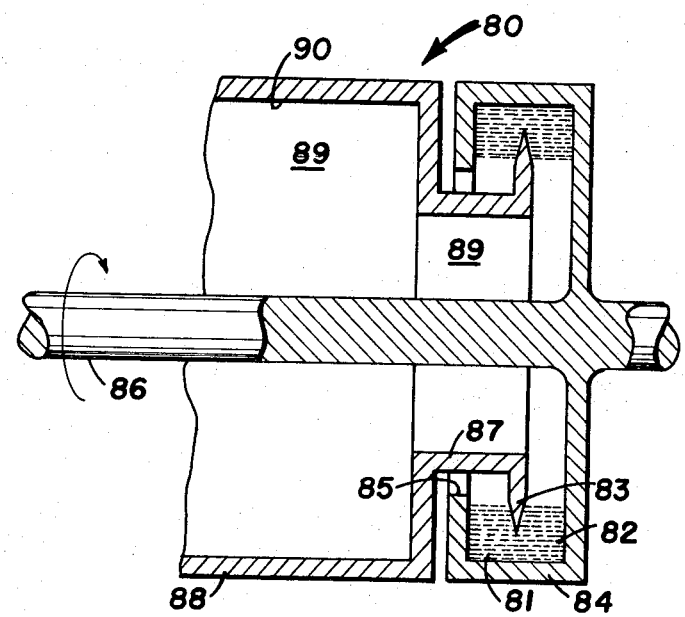
FIG. 7 is a sectional view, also archetypal, of a rotary structure primarily having sealing capability.

FIG. 7 shows a rotary seal configuration 80 which is closely related to the rotary structures previously described herein. The rotary seal 80 consists essentially of a rotatable housing 81 containing a high density fluid 82, the housing and fluid surrounding a fixed barrier, i.e., a stationary annular flange 83. The housing 81 is a cylindrical body having an axial opening 85 on one face thereof and a rotatable shaft 86 extending axially therethrough.

The annular flange 83 tapers outwardly from a cylindrical stationary neck 87 which freely extends through the opening 85 in the housing 81 and into the interior of said housing. The neck 87 is a reduced continuation of a stationary structure 88 which defines an area being sealed from ambient.

Figure 8:
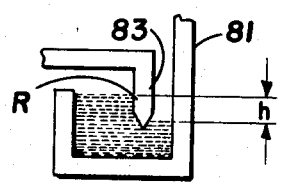
FIG. 8 is a schematic view of a portion of the rotary structure of FIG. 7, illustrating the operation of the structure.

Referring to FIG. 8, the seal pressure capability may be seen to depend from the relationship:

$$P = (W/g) R \omega^2 h,$$

where:
$P$ = pressure, pounds/square inch
$W$ = fluid density, pounds/cubic inch
$R$ = nominal fluid radius, feet
$\omega$ = rotation speed, radians/sec
$g$ = gravitational acceleration
$h$ = pressure head, inches.

Rotation of the housing 81 produces a centrifugal acceleration field on the fluid 82 which is opposed by the pressure head across said fluid, the pressure head being caused by the pressurization of a fluid 89 sealed and held within a cavity 90, which cavity 90 forms a portion of the volume being sealed. As the pressure within the cavity 90 increases, the pressure head increases and is resisted by the centrifugal force acting on the heavier fluid 82. Thus, if the fluid 82 were elemental mercury (0.5 pound/cubic inch), if the seal diameter were 2 inches, if the working pressure head were 0.1 inch, and if the angular velocity were 3,000 radians/sec, the pressure capability of the seal 80 would be about 1,170 psi with zero leakage. Speed limitation depends on efficient heat dissipation from the fluid 82; since the area of contact between the stationary barrier, i.e., the flange 83 and the fluid 82 is relatively small, drag heat losses are minimal, generally varying as $R^3$ and as $\omega^2$.

It should be understood that the rotary structures described above as preferred embodiments of the invention are active structures; i.e., the high density fluid in each of the structures must be rotated at a given minimum operational speed in order for the structure to be effective. The several embodiments of the invention do not possess static capability. However, this capability may be integrated into a total design depending on the demands of each application. As a further example, the seal 80 of FIG. 7 may be provided with static sealing capability through the use of conventional seals, said seal 80 becoming operative at a certain rotation rate at which or above which the static seal might not be adequate. In many applications, the geometry of the rotating housing 81 can be so arranged as to contain the fluid 82 in the static condition without special seals. Generally, conventional bearings may be incorporated into the bearing structures so that the present bearings float the rotating member away from the conventional bearings at a certain operating speed.

Although mercury is chosen herein to provide performance data for the invention, any high density fluid, even water, may be employed. If the present rotary structures were used for extremely high temperature applications, molten metals might even be used. Thus, it is believed apparent that the invention may be practiced other than as specifically detailed herein without departing from the scope of the invention as defined by the following claims.

I claim:

1. A rotary structure comprising an annular housing having a cavity therein,
   a fluid in the cavity,
   means for rotating the housing,
   said fluid being moved by centrifugal force toward the perimeter of the housing upon rotation of said housing,
   fixed support means extending into the housing,
   means on said fixed support means and engaging the fluid in the cavity during rotation of the housing, the major portions of said means which contact the fluid being triangular in cross-section, and
   ferrofluid sealing means between the means on said fixed support means and opposed points on the housing.

2. A rotary structure comprising an annular housing having a cavity therein,
   a fluid in the cavity,
   means for rotating the housing,
   said fluid being moved by centrifugal force toward the perimeter of the housing upon rotation of said housing,
   fixed support means extending into the housing,
   an annular disc having a peripheral edge on said fixed support means, the peripheral edge of the disc engaging the fluid in the cavity during rotation of the housing, and
   a second fluid disposed in the cavity within a reduced portion thereof defined by the disc and an opposed wall of the housing, said second fluid being relatively less dense than the first-mentioned fluid and being sealed within said reduced portion of the cavity by the first-mentioned fluid.

3. The rotary structure of claim 2 wherein the peripheral edge on the annular disc is triangular in cross-section.

4. The rotary structure of claim 2 wherein the second-mentioned fluid is immiscible with the first-mentioned fluid.

5. The rotary structure of claim 2 wherein the fixed support means comprises a stationary shaft mounting the annular disc within the housing.

6. The rotary structure of claim 2 wherein the means for rotating the housing is a rotatable shaft.

7. The rotary structure of claim 2 wherein the annular disc is comprised of frusto-conical sections joined at their base surfaces.

* * * * *